United States Patent [19]
Jysky et al.

[11] 3,895,929
[45] July 22, 1975

[54] DEVICE FOR COLLECTING DRILL DUST

[75] Inventors: Göran Jysky; Ilmar Mardla; Björn Eriksson, all of Nykoping, Sweden

[73] Assignee: Ilmeg AB, Nykoping, Sweden

[22] Filed: July 17, 1972

[21] Appl. No.: 272,415

[30] Foreign Application Priority Data
July 19, 1971 Sweden.............................. 9269/71

[52] U.S. Cl. ..................... 55/334; 53/193; 55/302; 55/305; 55/337; 55/366; 55/370; 55/429
[51] Int. Cl. ............................................ B01d 50/00
[58] Field of Search ............ 55/334, 335, 302, 305, 55/337, 366, 369, 370, 372, 374, 428, 429, 432, 433, 377, 380, DIG. 26; 53/193

[56] References Cited
UNITED STATES PATENTS

| | | | |
|---|---|---|---|
| 414,980 | 11/1889 | Kutsche | 55/433 X |
| 686,404 | 11/1901 | Hess | 55/433 |
| 940,076 | 11/1909 | Seaver | 55/337 X |
| 1,170,438 | 2/1916 | Fahrney | 55/337 |
| 1,944,270 | 1/1934 | Reeve | 55/366 X |
| 2,338,504 | 1/1944 | Foster | 55/374 X |
| 3,650,298 | 3/1972 | Delmar | 53/193 UX |

*Primary Examiner*—Frank W. Lutter
*Assistant Examiner*—William Cuchlinski, Jr.
*Attorney, Agent, or Firm*—William R. Woodward

[57] ABSTRACT

A device for collecting drill dust which is conveyed by an air stream to an apparatus for separating the dust from said air stream. The dust separated in said apparatus being supplied to a collecting bag connected to the outlet end of said apparatus. The bag being formed from a stock of flexible tube material in the shape of a folded flexible hose placed around the lower portion of the separating apparatus and arranged to be successively withdrawn and tightly secured around the downwardly opening outlet of said separating apparatus upon withdrawal of a suitable length thereof.

3 Claims, 3 Drawing Figures

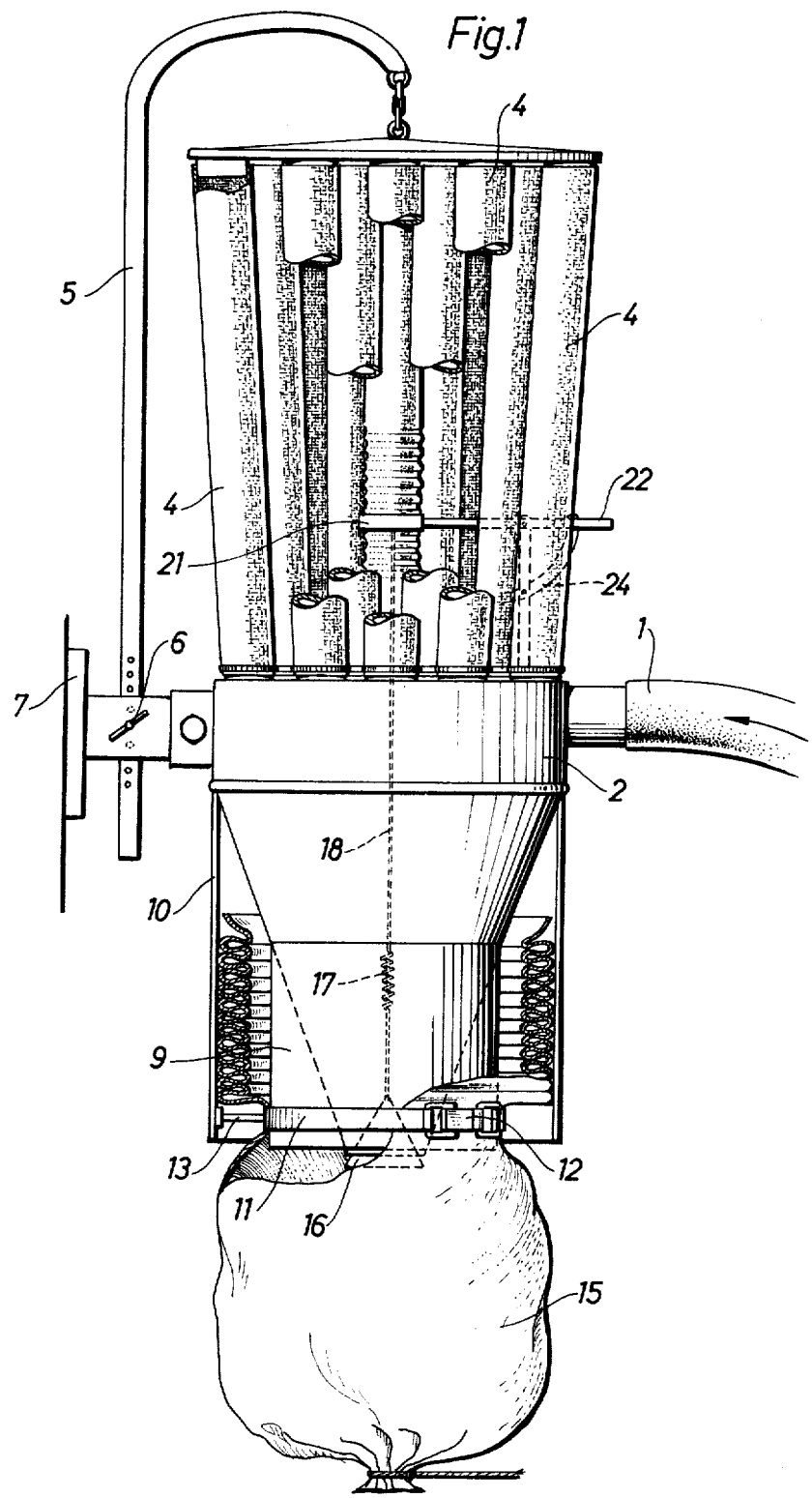

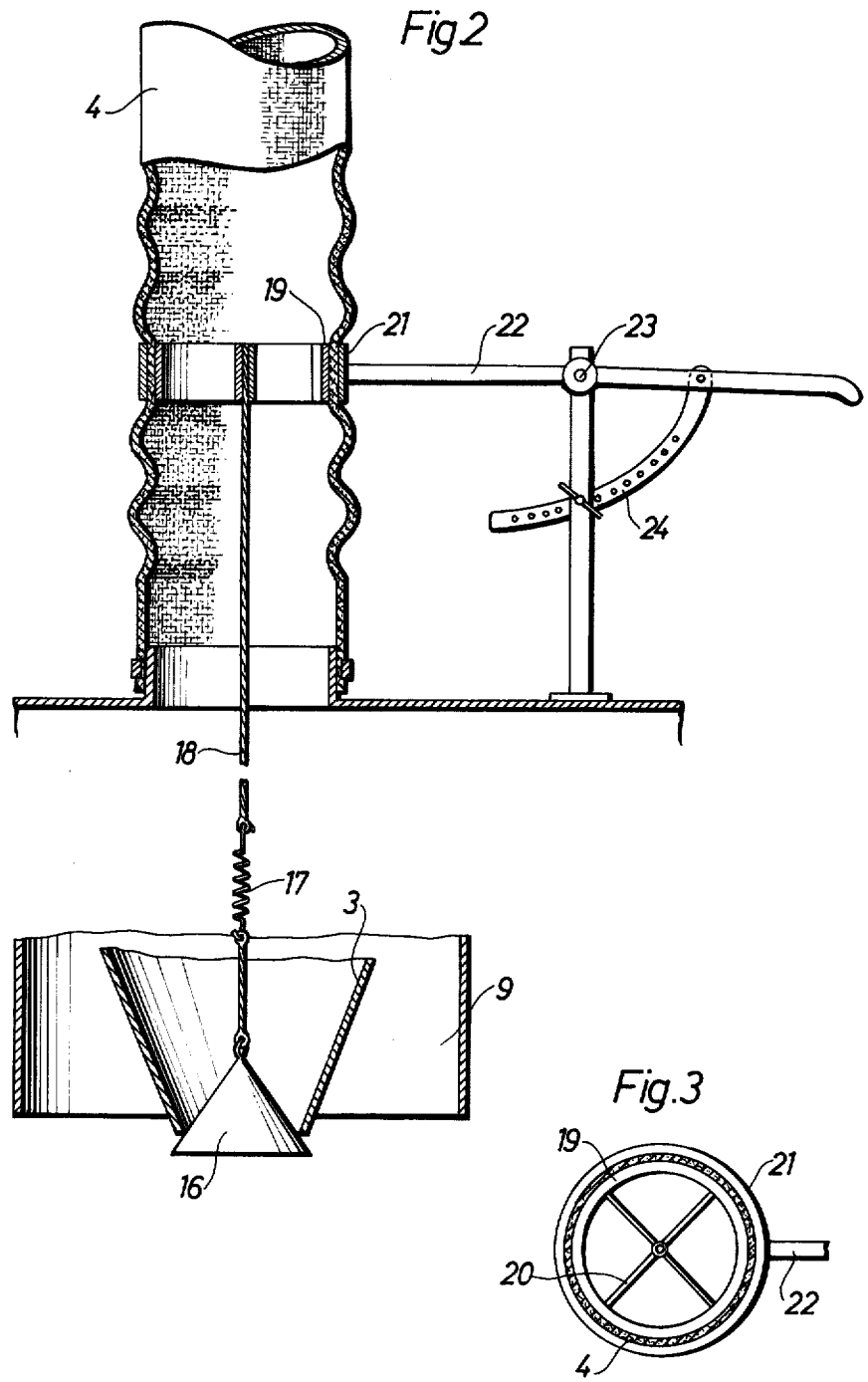

DEVICE FOR COLLECTING DRILL DUST

The present invention relates to a device for collecting drill dust, especially in rock drilling. Said dust is conveyed by an air stream to an apparatus for separating the dust from said air stream, the separated drill dust being then supplied to a bag connected to the outlet end of said apparatus.

In prior art devices for collecting drill dust produced by rock drilling equipments and transported from the drill bore by means of an air stream, from which the drill dust is separated in a cyclone and filter apparatus, the drill dust is usually collected in a container, a bag or the like. When the bag or container is to be emptied or shifted the drilling apparatus must be stopped to avoid free discharge of dust from the drill. In connection with the removal of the bag a certain amount of drill dust may whirl up therefrom and thereby to some extent counteract the aim of the device which is to prevent dust from escaping into the atmosphere and causing unhealthy dust concentrations within the working area.

The main object of the present invention is to provide an improved collecting device of the kind initially described which effectively prevents any distribution of drill dust in connection with the removal of the bag from the separating apparatus. Another object of the invention is to make it possible to shift the bag without temporarily interrupting the drilling operation. Still another object is to make it possible in a very simple manner to vary the volume of the bag in response to various requirements.

The invention provides an improved collecting device of the kind initially defined which is primarily characterized in that a stock of flexible tube material in the shape of a folded flexible hose is placed around the lower portion of the separating apparatus and arranged to be successively withdrawn in desired lengths to form successive bags, means being provided for securing a bag thus formed tightly around the downardly opening outlet of said separating apparatus.

Below the invention will be described in greater detail, reference being had to the accompanying drawing, in which:

FIG. 1 is a side elevation, partly in section, of a combined cyclone and filter apparatus provided with a collecting and packing device according to the present invention;

FIG. 2 is a partial view showing in vertical section and on an enlarged scale certain details of the equipment of FIG. 1; and FIG. 3 is a horizontal section through a filter hose shown in FIG. 2.

According to FIG. 1 the dust-containing air from a drilling apparatus is fed through a conduit 1 to a cyclone 2. In the latter coarse dust particles are separated in known manner as a consequence of the deflection of the incoming air. Said dust particles will, due to their own weight, fall down towards the bottom end of the lower portion of the cyclone 2 which has a frusto-conical shape. Air passing through the opening at the upper end of the cyclone and through the filter hoses 4 still contains a comparatively large amount of fine dust particles. These particles are, however, stopped by the filter material forming the walls of hoses 4 and thereby prevented from escaping into the ambient atmosphere. In the embodiment illustrated, the filter hoses 4 are suspended by means of a bracket 5 which by suitable fastening means 6 is fixed to the supporting frame 7 of a drilling apparatus. Hereby the filter hoses will be caused to vibrate when the drilling apparatus is in operation or moved from one drilling position to another. These vibrations will effectively contribute to prevent the formation of thick layers of dust particles on the inner wall surfaces of the filter hoses. Additional cleaning of the filter hoses can be carried out in different ways, for instance by means of a suitable vibration source or by manually shaking the hoses or by blowing pressurized air on the hoses.

According to the invention dust particles passing through the discharge opening at the lower end of the frusto-conical cyclone portion 3 are collected in bags formed through withdrawal of a suitable length of flexible tube material from a stock of such material provided in the shape of a folded flexible hose 8. In the embodiment illustrated the stock of flexible tube material is arranged in a storing space between a cylinder 9 surrounding the lower portion of the frusto-cone 3 and a number of brackets 10 extending downwards from the base of the conical portion 3 parallel to the wall of said cylinder. During operation the bag-forming flexible tube material is pressed into sealing engagement with the outer surface of the cylinder 9 by means of a clamping strip 11 provided with a quick-action locking mechanism 12. Reference numeral 13 designates spacing means extending between the brackets 10 and the clamping strip 11.

When the collecting and packing device according to the invention is used in conjunction with a cyclone and filter apparatus according to FIG. 1 the clamping strip 11 is released by means of the locking mechanism 12 before a drilling operation is started and a suitable length of the folded flexible hose material is withdrawn from the stock and sealed or closed at its lower end in any convenient manner, e.g. by means of a tie wire 14. When, in this manner, a bag 15 of any desired length has been formed the hose material is again sealed against the cylinder 9 by means of the clamping strip 11 and the locking mechanism 12 whereupon the drilling operation can be started.

The invention makes it possible to use a comparatively thin foil of plastic material to form the bags also when the latter is intended for collecting rock drill dust which is very heavy in concentrated form, as the length of the bags can be selected so that the bottom of the bag will rest on ground or on other suitable support. The possibility of varying length of the bags is of great advantage, especially at vehicle-born drilling apparatus where the distance between the discharge opening of the dust separator equipment and the ground surface may vary considerably depending on the ground or terrain configuration. The device above described also makes it possible to shift the bag during continuous operation of the drilling apparatus without causing any risk that the operator will come into contact with the drill dust. To shift the bag 15 the latter is sealed at two adjacent points above the dust material contained therein whereupon the bag-forming hose is cut-off between said points. Hereby a separate sealed bag containing the collected dust is formed simultaneously as a new bag is formed. Thereupon the clamping strip 11 is released by means of the locking mechanism 12 and the new bag is withdrawn to the desired length from the stock of flexible tube material. If desired, the bag may be lengthened also during the collection of dust therein.

In order to make it possible to shift the bag during continuous operation of the drilling apparatus the illustrated dust separation equipment is provided with a valve member 16 fitting into the discharge opening of the frusto-cone 3. Over a spring 17 and a wire 18 said valve member 16 is connected to an operating mechanism comprising an inner annular member 19 provided within a filter hose 4 and carrying a cross 20 to which the wire 18 is attached. Reference numeral 21 designates an outer annular member 21 surrounding the inner annular member 19 and the corresponding portion of the hose 4 to clamp the hose material between said members. A lever 22 is pivotally mounted on a pin 23 and connected at its one end to the outer annular member 21. Said lever 22 can be operated manually and locked in any desired position by a locking means 24. In order to make it possible to vary the position of valve member 16 by means of the lever 22 the filter hose 4 clamped between the annular members 19 and 21 is of slightly greater length than the remaining filter hoses as illustrated in the drawing by showing said filter hose as partially folded. The discharge opening at the lower end of the frusto-cone 3 can thus be opened and closed by means of the lever 22. During the shifting of the bag, i.e. the provision of the two seals and the withdrawal of the desired length of flexible tube material to form the next bag, the discharge opening is closed and dust temporarily collected in the lower portion of the frusto-cone 3. When the new bag has been formed and clamped against the cylinder 9 the discharge opening is again opened and the collected dust automatically discharged into the bag. The mechanism for opening and closing the discharge opening can thus be operated from the outside without requiring any means extending through the filter material or the cyclone casing which is of great advantage in an equipment for collecting dust material having the ability to pass through even extremely small apertures.

By storing the stock of flexible tube material in the form of a folded hose 8 between the cylinder 9 and the brackets 10 very large lengths, i.e. the required material for a large number of bags, can be stored in a comparatively small space. The locking and clamping mechanism 11 and 12 surrounding the lower portion of cylinder 9 may suitably be such as to permit complete opening thereof and the brackets 10 can suitably be resilient or retractable in any other manner to simplify the insertion of a new folded flexible hose in the space between the brackets 10 and the cylinder 9.

The invention has been described above in connection with a special type of dust separating equipment for drilling apparatus. However, the invention may be utilized also for other collecting and packing purposes. The principal advantages of the device consist in that it permits use of bags of varying lengths, a continuous collection and packing of the desired material, and the separation of individual bags without any risk for unhealthy contact with the contents of the bags. The sealing of the bags may be carried out in any suitable way. Thus, instead the bags may also be glued or welded. In the latter case the device may be provided with a suitable welding and separating equipment adapted for semi-automatical or fully automatical operation.

What is claimed is:

1. A device for collecting drill dust, especially in rock drilling, comprising:
   means for conveying dust in an air stream;
   means for separating the dust from said air stream, said separating means having a downwardly opening dust outlet;
   means for storing a stock of flexible tube material in annular folded form around the lower portion of said separating means and the dust outlet thereof, said storing means being equipped with means for dispensing said tube material from storage intermittently in desired lengths to allow formation of successive bags therefrom in position for filling with dust through said outlet;
   means surrounding said tube material stored in said storing means for causing a bag formed as aforesaid to be secured tightly around the downwardly opening outlet of said separating means;
   a continuous length of flexible tube material sufficient to form a plurality of bags folded in an annular pack and held in said storage means, and
   means for temporarily closing said dust outlet in the interval between the filling of one bag and completion of the formation and securing of a succeeding bag without interrupting the operation of said separating means or that of said conveying means.

2. A device according to claim 1, wherein said separating means comprises a cyclone the lower, frusto-conical portion of which forms a collecting chamber and is provided with said means for temporarily closing said dust outlet.

3. A device for collecting drill dust, especially in rock drilling, comprising:
   means for conveying dust in an air stream;
   means for separating the dust from said air stream, said separating means including a cyclone device having a lower frusto-conical portion forming a collecting chamber equipped with a downwardly opening dust outlet, having also a filter hose arranged above and connected to the cyclone device, and having means for temporarily closing said dust outlet including a holding member located within said filter hose and fixed to the hose by a clamping member applied on the outer surface of the hose and operating means connected to the clamping member to operate said closing means;
   means for storing a stock of flexible tube material in annular folded form around the lower portion of said separating means and the dust outlet thereof, said storing means being equipped with means for dispensing said tube material from storage intermittently in desired lengths to form successive bags therefrom, and
   means surrounding said storing means for causing a bag formed as aforesaid to be secured tightly around the downwardly opening outlet of said separating means.

* * * * *